(12) United States Patent
Lee (10) Patent No.: US 9,145,814 B2
(45) Date of Patent: Sep. 29, 2015

(54) SYSTEM AND METHOD OF DEFULFURIZING LEAN NOX TRAP

(71) Applicant: Hyundai Motor Company, Seoul (KR)

(72) Inventor: Jin Ha Lee, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/313,974

(22) Filed: Jun. 24, 2014

(65) Prior Publication Data

US 2015/0143799 A1 May 28, 2015

(30) Foreign Application Priority Data

Nov. 22, 2013 (KR) .................. 10-2013-0143261

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 9/00* | (2006.01) |
| *F01N 3/023* | (2006.01) |
| *B01D 53/50* | (2006.01) |
| *B01D 53/54* | (2006.01) |
| *B01D 53/60* | (2006.01) |
| *B01D 53/94* | (2006.01) |

(52) U.S. Cl.
CPC .............. *F01N 9/002* (2013.01); *B01D 53/50* (2013.01); *B01D 53/54* (2013.01); *B01D 53/60* (2013.01); *B01D 53/9418* (2013.01); *B01D 53/9481* (2013.01); *F01N 3/023* (2013.01); *F01N 3/208* (2013.01)

(58) Field of Classification Search
USPC .................. 60/295, 297, 277, 299–301, 311
See application file for complete search history.

(56) References Cited

U.S. PATENT DOCUMENTS

| 7,054,734 B2* | 5/2006 | Todoroki et al. .............. 701/105 |
| 2004/0123590 A1* | 7/2004 | Tabata et al. .................... 60/295 |
| 2005/0039440 A1* | 2/2005 | Kitahara ......................... 60/274 |
| 2005/0039442 A1* | 2/2005 | Ishibashi et al. ................ 60/285 |
| 2005/0086933 A1* | 4/2005 | Nieuwstadt et al. ........... 60/297 |
| 2006/0005532 A1* | 1/2006 | Kitahara ......................... 60/285 |
| 2006/0137327 A1* | 6/2006 | Shirakawa et al. ............. 60/285 |

FOREIGN PATENT DOCUMENTS

| EP | 1 510 671 A2 | 3/2005 |
| JP | 2013-514881 A | 5/2013 |
| KR | 10-2007-0095857 A | 10/2007 |
| KR | 10-0906876 B1 | 7/2009 |
| KR | 10-2013-0017957 A | 2/2013 |

* cited by examiner

*Primary Examiner* — Audrey K Bradley
*Assistant Examiner* — Dapinder Singh
(74) *Attorney, Agent, or Firm* — Morgan, Lewis & Bockius LLP (57) ABSTRACT

A system of dusulfurizing an LNT may control desulfurization of the LNT provided in an apparatus of purifying exhaust gas, in which the LNT may be adapted to absorb nitrogen oxide (NOx) contained in the exhaust gas at a lean air/fuel ratio and to release the absorbed nitrogen oxide and reduce the nitrogen oxide contained in the exhaust gas or the released nitrogen oxide at a rich air/fuel ratio and the apparatus of purifying exhaust gas may further include a particulate filter trapping particulate matter contained in the exhaust gas as soot and regenerated by burning the trapped soot when a regeneration condition is satisfied, and a controller controlling desulfurization of the LNT and regeneration of the particulate filter.

16 Claims, 4 Drawing Sheets

SYSTEM AND METHOD OF DEFULFURIZING LEAN NOX TRAP

CROSS-REFERENCE TO RELATED APPLICATION

The present application claims priority to and the benefit of Korean Patent Application No. 10-2013-0143261 filed on Nov. 22, 2013, the entire contents of which is incorporated herein for all purposes by this reference.

BACKGROUND OF THE INVENTION

1. Field of the Invention

The present invention relates to a system and a method of desulfurizing a lean NOx trap (LNT). More particularly, the present invention relates to a system and a method of desulfurizing a lean NOx trap that improves fuel economy by not exiting from a desulfurization mode but performing desulfurization again under predetermined conditions even though a desulfurization stop condition of the LNT is satisfied.

2. Description of Related Art

Generally, exhaust gas flowing out from an engine through an exhaust manifold is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst absorbs the NOx contained in the exhaust gas when air/fuel ratio is lean (smaller than 1), and releases the absorbed NOx and reduces the released nitrogen oxide and the nitrogen oxide contained in the exhaust gas when the air/fuel ratio is rich (greater than 1).

Since materials which absorb the nitrogen oxide in the LNT, however, are base materials, sulfur oxide (material obtained by oxidizing sulfur contained in fuel or engine oil) as well as the nitrogen oxide contained in the exhaust gas is absorbed. Sulfur poisoning in the LNT deteriorates purification efficiency of the LNT. Therefore, desulfurization of the LNT is necessary.

According to a conventional method of desulfurizing the LNT, the engine is controlled to enter a desulfurization mode so as to release the sulfur oxide poisoned in the LNT if an amount of the sulfur oxide poisoned in the LNT is greater than or equal to a predetermined amount. If it is difficult to continue the desulfurization because a driving condition is changed during performing the desulfurization, for example, the vehicle slows down or a road is congested, the desulfurization is stopped and the engine is returned to a normal driving mode. At this state, if a driving condition satisfies a condition where the desulfurization is possible, a temperature of the exhaust gas is raised and the engine enters the desulfurization mode again.

In addition, if the desulfurization mode is to be carried out just after the regeneration of the particulate filter is performed, the engine enters a regeneration mode of the particulate filter so as to enter the desulfurization mode. That is, after the particulate filter is regenerated, the engine enters the desulfurization mode. In further detail, if a desulfurization stop condition is satisfied, the engine is left from the desulfurization mode. After that, the engine does not enter the desulfurization mode immediately, but enters the regeneration mode of the particulate filter. After the particulate filter is regenerated, the engine enters the desulfurization mode again. Therefore, fuel consumption may be deteriorated, the engine may be damaged, and urea consumption may increase when regenerating the particulate filter.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method of desulfurizing an LNT having advantages of improving fuel economy by not exiting from a desulfurization mode but performing desulfurization again under predetermined conditions even though a desulfurization stop condition of the LNT is satisfied. Therefore, deterioration of fuel consumption due to repetitive entry into the desulfurization mode or entry into the desulfurization mode after reentry into a regeneration mode of a particulate filter may be prevented, and degradation of the LNT due to the desulfurization mode may be prevented.

In an aspect of the present invention, a system of desulfurizing a lean NOx trap (LNT) provided in an apparatus of purifying exhaust gas, may include the LNT adapted to absorb nitrogen oxide (NOx) contained in the exhaust gas at a lean air/fuel ratio and to release the absorbed nitrogen oxide and reduce the nitrogen oxide contained in the exhaust gas or the released nitrogen oxide at a rich air/fuel ratio, and the apparatus of purifying exhaust gas may include a particulate filter trapping particulate matter contained in the exhaust gas as soot and regenerated by burning the trapped soot when a regeneration condition is satisfied, and a controller controlling desulfurization of the LNT and regeneration of the particulate filter, wherein the controller proceeds to desulfurize the LNT when a regeneration amount of the soot is greater than or equal to a predetermined regeneration amount during the regeneration of the particulate filter, stops the desulfurization of the LNT when a desulfurization stop condition is satisfied during the desulfurization of the LNT, and prepares to regenerate the particulate filter again when desulfurization stop numbers from previous completion of the desulfurization up to the present are greater than or equal to a predetermined value and a sulfur poisoning amount is less than a predetermined sulfur poisoning amount.

The controller may proceed to desulfurize the LNT if a regeneration amount of the soot is greater than or equal to a predetermined regeneration amount during the regeneration of the particulate filter, may stop the desulfurization of the LNT if a desulfurization stop condition is satisfied during the desulfurization of the LNT, and may prepare to regenerate the particulate filter again if desulfurization stop numbers from previous completion of the desulfurization up to the present are greater than or equal to a predetermined value and a sulfur poisoning amount is less than a predetermined sulfur poisoning amount.

The controller may proceed to regenerate the particulate filter again if the desulfurization of the LNT is possible after preparing to regenerate the particulate filter again.

The controller may issue a first warning which suggests desulfurization driving before proceeding to regenerate the particulate filter again.

The controller may completely stop the desulfurization and the regeneration of the particulate filter and may enter a normal driving mode if the desulfurization stop numbers from the previous completion of the desulfurization up to the present are smaller than the predetermined value.

The controller may prepare to regenerate the particulate filter again if the desulfurization stop numbers from the previous completion of the desulfurization up to the present are greater than or equal to the predetermined value, the sulfur poisoning amount is larger than or equal to the predetermined sulfur poisoning amount, and a NOx purification rate is greater than a predetermined NOx purification rate.

The controller may proceed to regenerate the particulate filter again if the desulfurization of the LNT is possible after preparing to regenerate the particulate filter again.

The controller may issue a first warning which suggests desulfurization driving before proceeding to regenerate the particulate filter again.

The controller may issue a second warning which suggests visiting a service center if the desulfurization stop numbers from the previous completion of the desulfurization up to the present are greater than or equal to the predetermined value, the sulfur poisoning amount is larger than or equal to the predetermined sulfur poisoning amount, and a NOx purification rate is smaller than or equal to a predetermined NOx purification rate.

A method of desulfurizing an LNT according to another exemplary embodiment of the present invention may include: regenerating the particulate filter, determining whether a soot regeneration amount of the particulate filter is greater than or equal to a predetermined regeneration amount, performing desulfurization of the LNT if the soot regeneration amount of the particulate filter is greater than or equal to the predetermined regeneration amount, determining whether a desulfurization stop condition of the LNT is satisfied, stopping the desulfurization of the LNT if the desulfurization stop condition of the LNT is satisfied, determining whether desulfurization stop numbers from previous completion of the desulfurization up to the present are greater than or equal to a predetermined value, determining whether a sulfur poisoning amount is less than a predetermined sulfur poisoning amount if the desulfurization stop numbers are greater than or equal to the predetermined value, and preparing to regenerate the particulate filter again if the sulfur poisoning amount is less than the predetermined sulfur poisoning amount.

The regeneration of the particulate filter may be performed again if the desulfurization of the LNT is possible after preparing to regenerate the particulate filter again.

The method may further include, before performing the regeneration of the particulate filter again, issuing a first warning which suggests desulfurization driving.

The method may further include, if the desulfurization stop number are smaller than the predetermined value, entering a normal driving mode.

The method may further include: determining whether a NOx purification rate is greater than a predetermined NOx purification rate if the sulfur poisoning amount is larger than the predetermined sulfur poisoning amount, and issuing a second warning which suggests visiting a service center if the NOx purification rate is smaller than or equal to the predetermined NOx purification rate.

The method may further include preparing to regenerate the particulate filter again if the NOx purification rate is greater than the predetermined NOx purification rate.

The regeneration of the particulate filter may be performed again if the desulfurization of the LNT is possible after preparing to regenerate the particulate filter again.

The method may further include, before performing the regeneration of the particulate filter again, issuing a first warning which suggests desulfurization driving.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
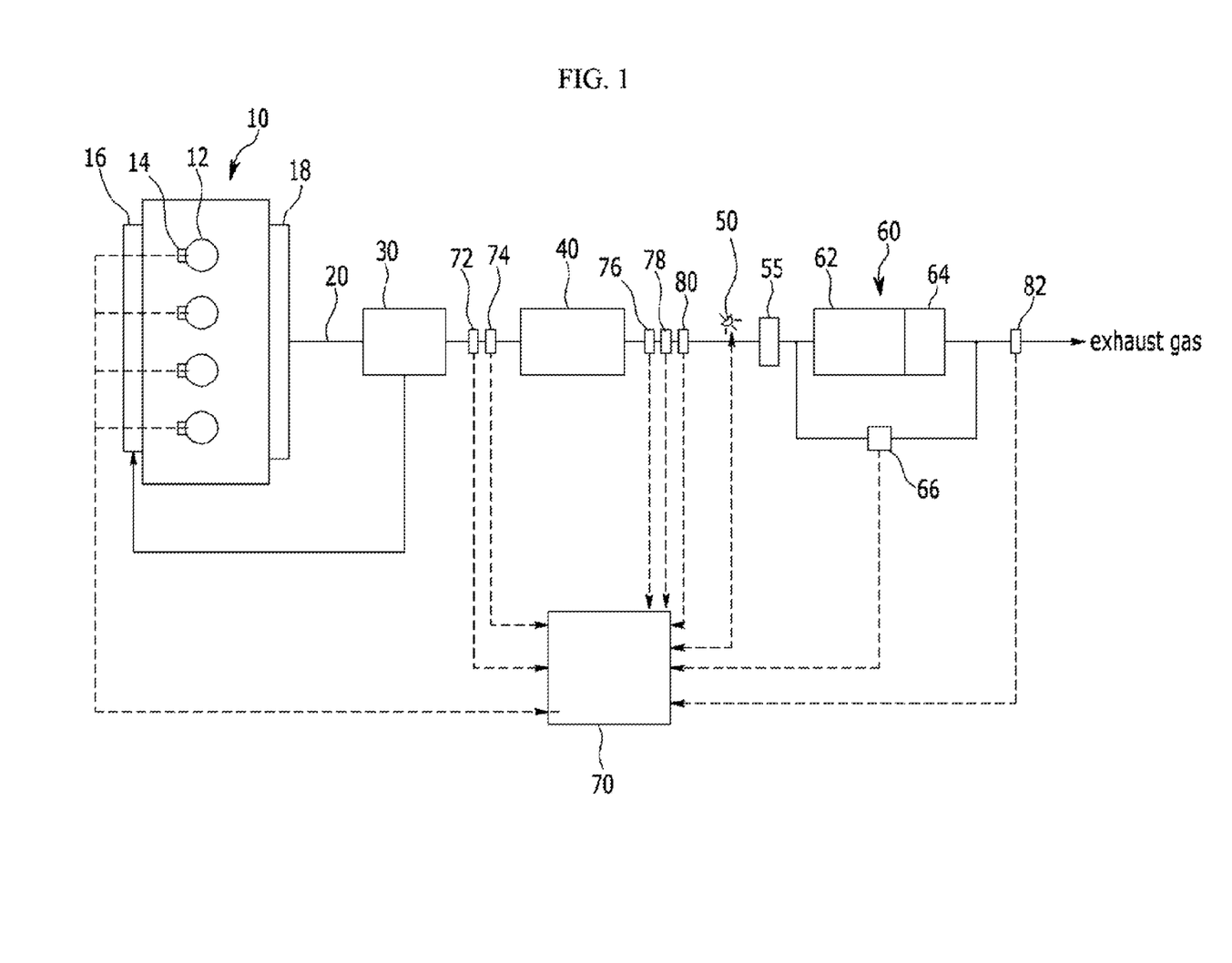
FIG. 1 is a schematic diagram of an apparatus of purifying exhaust gas to which a system of dusulfurizing an LNT according to an exemplary embodiment of the present invention can be applied.

FIG. 1 is a schematic diagram of an apparatus of purifying exhaust gas to which a system of dusulfurizing an LNT according to an exemplary embodiment of the present invention can be applied.

As shown in FIG. 1, an apparatus of purifying exhaust gas for an internal combustion engine includes an engine 10, an exhaust pipe 20, an exhaust gas recirculation (EGR) apparatus 30, a lean NOx trap (LNT) 40, a dosing module 50, a particulate filter 60, and a controller 70.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug is mounted at an upper portion of the combustion chamber 12. In addition, if a gasoline direct injection (GDI) engine is used, the injector 14 is mounted at the upper portion of the combustion chamber 12.

In addition, the engines having various compression ratios, preferably a compression ratio lower than or equal to 16.5, may be used.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbon, carbon monoxide, particulate matter, and nitrogen oxide contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling amount of the exhaust gas supplied back to the intake manifold 16 by control of the controller 70. Therefore, a recirculation valve controlled by the controller 70 may be mounted on a line connecting the exhaust gas recirculation apparatus 30 and the intake manifold 16.

A first oxygen sensor 72 is mounted on the exhaust pipe 20 downstream of the exhaust gas recirculation apparatus 30. The first oxygen sensor 72 detects oxygen amount in the exhaust gas passing through the exhaust gas recirculation apparatus 30 and transmits a signal corresponding thereto to the controller 70 so as to help lean/rich control of the exhaust gas performed by the controller 70. In this specification, the detected value by the first oxygen sensor 72 is called air/fuel ratio (lambda) at an upstream of the LNT.

In addition, a first temperature sensor 74 is mounted on the exhaust pipe 20 downstream of the exhaust gas recirculation apparatus 30 and detects temperature of the exhaust gas passing through the exhaust gas recirculation apparatus 30.

The LNT 40 is mounted on the exhaust pipe 20 downstream of the exhaust gas recirculation apparatus 30. The LNT 40 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbon (HC) contained in the exhaust gas.

Herein, the hydrocarbon represents all compounds including carbon and hydrogen contained in the exhaust gas and the fuel.

A second oxygen sensor 76, a second temperature sensor 78, and a first NOx sensor 80 are mounted on the exhaust pipe 20 downstream of the LNT 40.

The second oxygen sensor 76 detects oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called air/fuel ratio (lambda) at an upstream of the filter.

The second temperature sensor 78 detects temperature of the exhaust gas flowing into the particulate filter 60 and transmits a signal corresponding thereto to the controller 70.

The first NOx sensor 80 detects NOx amount contained in the exhaust gas flowing into the particulate filter 60 and transmits a signal corresponding thereto to the controller 70. The NOx amount detected by the first NOx sensor 80 may be used to determine amount of reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia. For convenience of explanation, it is exemplified hereinafter that the ammonia is used as the reducing agent and the dosing module 50 injects the urea. However, it is to be understood that the reducing agent other than the ammonia is also included within the scope of the present invention without changing the spirit of the present invention.

A mixer 55 is mounted on the exhaust pipe 20 downstream of the dosing module 50 and mixes the reducing agent and the exhaust gas evenly.

The particulate filter 60 is mounted on the exhaust pipe downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction catalyst (SCR) 64.

The SDPF 62 is formed by coating the SCR on walls defining channels of the DPF. Generally, the DPF includes a plurality of inlet channels and outlet channels. Each of the inlet channels includes an end that is open and the other end that is blocked, and receives the exhaust gas from a front end of the DPF. In addition, each of the outlet channels includes an end that is blocked and the other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR coated on the SDPF 62 reduces the nitrogen oxide contained in the exhaust gas using the reducing agent injected by the dosing module 50.

The additional SCR 64 is mounted at the rear of the SDPF 62. The additional SCR 64 further reduces the nitrogen oxide if the SDPF 62 purifies the nitrogen oxide completely.

Meanwhile, a pressure difference sensor 66 is mounted on the exhaust pipe 20. The pressure difference sensor 66 detects pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than predetermined pressure. In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects amount of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate performance of the particulate filter 60.

The controller 70 determines a driving condition of the engine based on the signals transmitted from each sensor, and performs the leans/rich control and controls the amount of the reducing agent injected by the dosing module 50 based on the driving condition of the engine. For example, the controller 70 controls the LNT 40 to remove the nitrogen oxide through the lean/rich control if the temperature of the exhaust gas is lower than transient temperature, and controls the particulate filter 60 to remove the nitrogen oxide by injecting the reducing agent if the temperature of the exhaust gas is higher than or equal to the transient temperature. The lean/rich control may be performed by controlling fuel amount injected by the injector 14.

Meanwhile, the controller 70 calculates inside temperature of the SPDF 62, ammonia amount absorbed in the SDPF 62, NOx exhaust amount from the LNT 40 in desulfurization, NOx exhaust amount from the LNT 40 in regeneration of the particulate filter 60, and so on the driving condition of the engine. For these purposes, absorbing/oxidizing characteristics of the ammonia according to the inside temperature of the particulate filter 60, releasing characteristics of the ammonia according to the inside temperature of the particulate filter 60, NOx slip characteristics of the LNT 40 at the rich air/fuel ratio, and so on are stored in the controller 70. The absorbing/oxidizing characteristics of the ammonia according to the inside temperature of the particulate filter 60, the releasing characteristics of the ammonia according to the inside temperature of the particulate filter 60, the NOx slip characteristics of the LNT 40 at the rich air/fuel ratio, and so on may be stored as maps through various experiments.

In addition, the controller 70 controls regeneration of the particulate filter 60 and desulfurization of the LNT 40.

Figure 2:
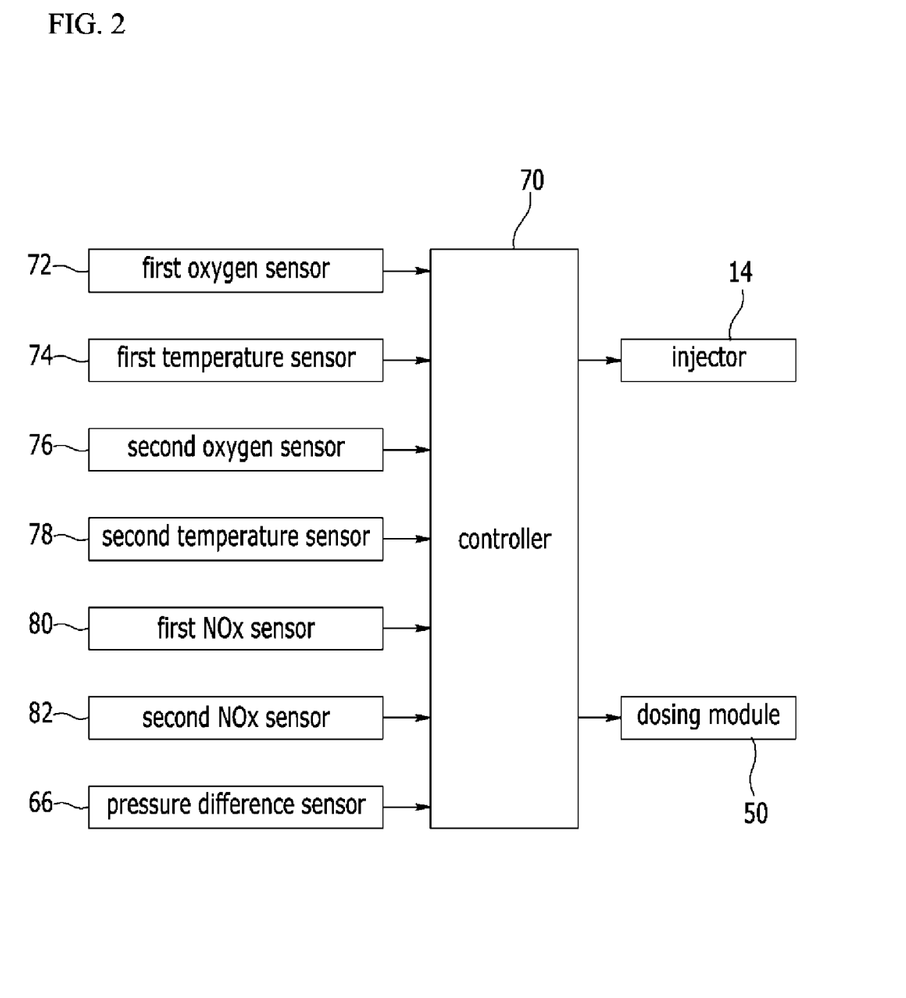
FIG. 2 is a block diagram illustrating a relationship of an input and output of a controller used in a method of desulfurizing an LNT according to an exemplary embodiment of the present invention.

FIG. 2 is a block diagram illustrating a relationship of an input and output of a controller used in a method of desulfurizing an LNT according to an exemplary embodiment of the present invention.

As shown in FIG. 2, the first oxygen sensor 72, the first temperature sensor 74, the second oxygen sensor 76, the second temperature sensor 78, the first NOx sensor 80, the second NOx sensor 82, and the pressure difference sensor 66 are electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as lambda ($\lambda$). The lambda means a ratio of actual air amount to stoichiometric air amount. If the lambda is greater than 1, the air/fuel ratio is lean. On the contrary, the air/fuel ratio is rich if the lambda is smaller than 1.

The first temperature sensor 74 detects the temperature of the exhaust gas passing through the exhaust gas recirculation apparatus 30 and transmits the signal corresponding thereto to the controller 70.

The second oxygen sensor 76 detects the oxygen amount in the exhaust gas flowing into the particulate filter 60 and transmits the signal corresponding thereto to the controller 70.

The second temperature sensor 78 detects the temperature of the exhaust gas flowing into the particulate filter 60 and transmits the signal corresponding thereto to the controller 70.

The first NOx sensor 80 detects the NOx amount contained in the exhaust gas flowing into the particulate filter 60 and transmits the signal corresponding thereto to the controller 70.

The second NOx sensor 82 detects the NOx amount contained in the exhaust gas exhausted from the particulate filter 60 and transmits the signal corresponding thereto to the controller 70.

The pressure difference sensor 66 detects the pressure difference between a front end portion and a rear end portion of the particulate filter 60 and transmits the signal corresponding thereto to the controller 70.

The controller 70 determines the driving condition of the engine, fuel injection amount, fuel injection timing, fuel injection pattern, injection amount of the reducing agent, regeneration timing of the particulate filter 60, and desulfurization timing of the LNT 40 based on the transmitted value, and outputs a signal for controlling the injector 14 and the dosing module 50 to the injector 14 and the dosing module 50.

The controller 70 can be realized by one or more processors activated by a predetermined program, and the predetermined program can be programmed to perform each step of a method of desulfurizing an LNT according to an exemplary embodiment of the present invention.

Meanwhile, a plurality of sensors other than the sensors illustrated in FIG. 2 may be mounted in the apparatus of purifying exhaust gas according to the exemplary embodiment of the present invention. For better comprehension and ease of description, however, description of the plurality of sensors will be omitted.

Hereinafter, referring to FIG. 3 and FIG. 4, a method of desulfurizing an LNT according to an exemplary embodiment of the present invention will be described in detail.

Figure 3:
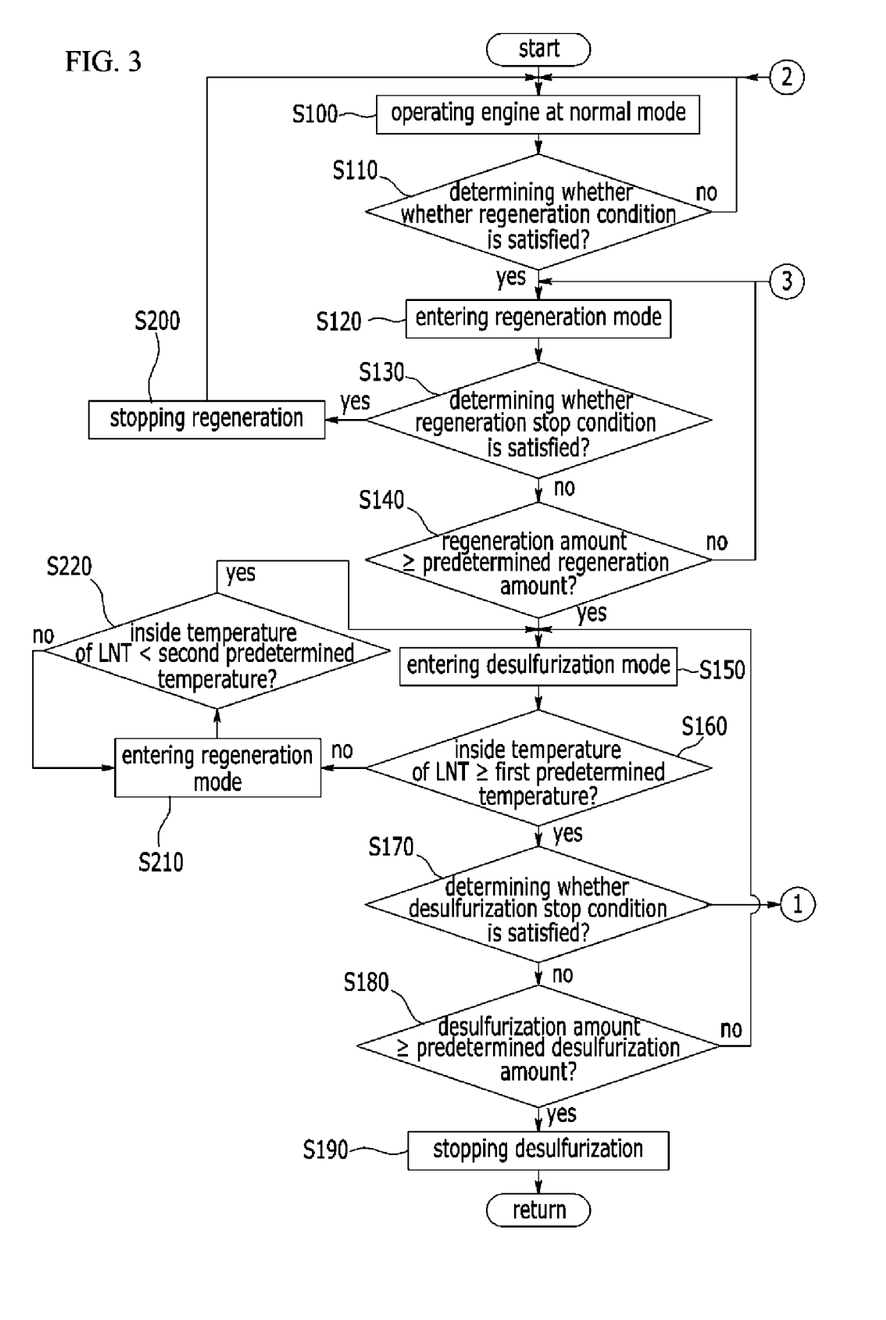
FIG. 3 and FIG. 4 are flowcharts of a method of desulfurizing an LNT according to an exemplary embodiment of the present invention.
Figure 4:
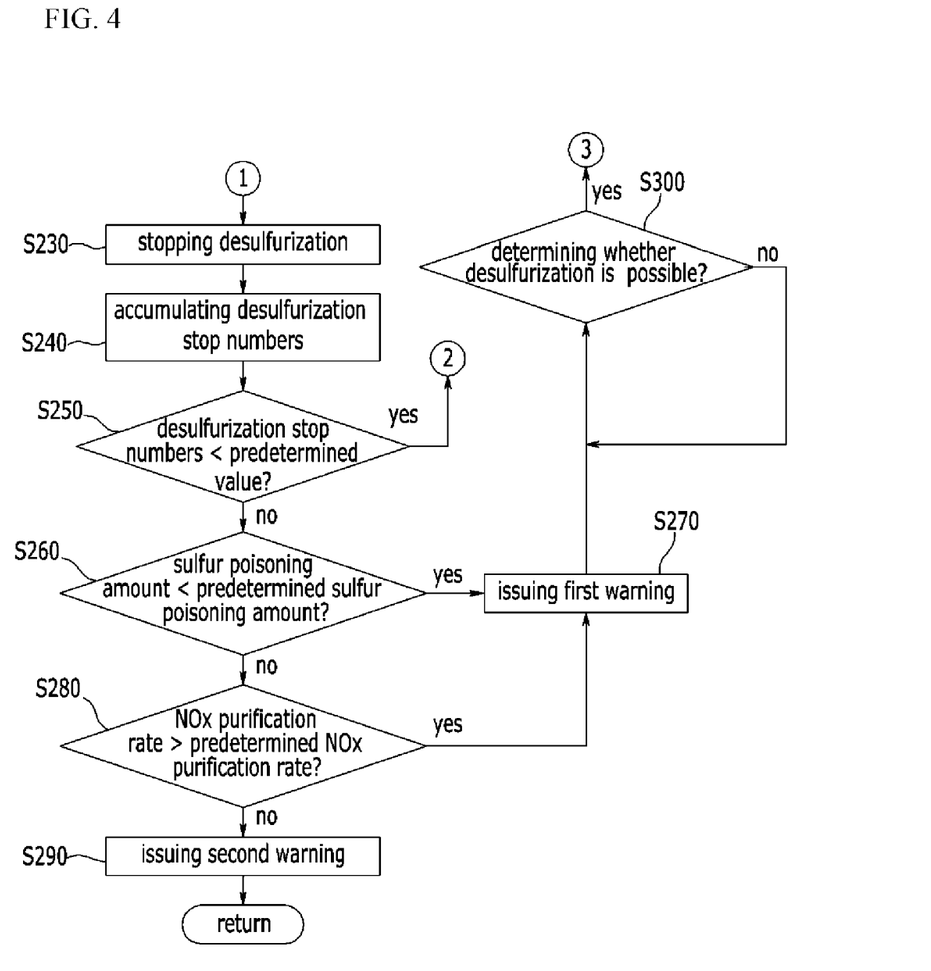

FIG. 3 and FIG. 4 are flowcharts of a method of desulfurizing an LNT according to an exemplary embodiment of the present invention.

As shown in FIG. 3 and FIG. 4, the method of desulfurizing the LNT according to the exemplary embodiment of the present invention is executed during operation of the engine 10. The engine 10 is firstly operated at a normal mode at step S100. Herein, the normal mode means a driving mode that is not a regeneration mode of the particulate filter 60 and a desulfurization mode of the LNT 40.

In a state that the engine 10 is operated at the normal mode, the controller 70 determines whether the regeneration condition of the particulate filter 60 is satisfied at step S110. That is, the pressure difference detected by the pressure difference sensor 66 is larger than or equal to the predetermined pressure.

If the regeneration condition of the particulate filter 60 is not satisfied at the step S110, the controller 70 returns to the step S100 and operates the engine 10 at the normal mode.

If the regeneration condition of the particulate filter 60 is satisfied at the step S110, the controller 70 enters the regeneration mode of the particulate filter 60 at step S120. That is, the controller 70 controls the exhaust gas not to be recirculated and controls the injector 14 to post-inject the fuel. Therefore, the temperature of the exhaust gas is raised. Therefore, the particulate matter trapped in the particulate filter 60 is burnt.

The controller 70 determines whether a regeneration stop condition of the particulate filter 60 is satisfied at step S130 during regenerating the particulate filter 60. That is, the controller 70 determines whether a vehicle speed decreases such that a temperature cannot be raised to a temperature necessary to regenerate the particulate filter 60.

If the regeneration stop condition of the particulate filter 60 is satisfied at the step S130, the controller 70 stops the regeneration of the particulate filter 60 at step S200 and operates the engine 10 at the normal mode at the step S100.

If the regeneration stop condition of the particulate filter 60 is not satisfied at the step S130, the controller 70 continues to regenerate the particulate filter 60 and to check a regeneration amount of the soot (particulate matter) from the particulate filter 60. After that, the controller 70 determines whether the regeneration amount of the soot from the particulate filter 60 is greater than or equal to a predetermined regeneration amount at step S140.

If the regeneration amount of the soot from the particulate filter 60 is less than the predetermined regeneration amount at the step S140, the controller 70 returns to the step S120.

If the regeneration amount of the soot from the particulate filter 60 is greater than or equal to the predetermined regeneration amount at the step S140, the controller 70 enters a desulfurization mode of the LNT at step S150 and performs the regeneration of the particulate filter 60 and the desulfurization of the LNT 40 simultaneously. The desulfurization of the LNT 40 is performed by the lean/rich control of the controller 70.

After that, the controller 70 determines whether an inside temperature of the LNT 40 is higher than or equal to a first predetermined temperature at step S160. If the inside temperature of the LNT 40 is lower than the first predetermined temperature, the controller 70 enters the regeneration mode of the particulate filter 60 again at step S210 and regenerates the particulate filter 60 again. After that, the controller 70 determines whether the inside temperature of the LNT 40 is lower than a second predetermined temperature at step S220. If the inside temperature of the LNT 40 is higher than or equal to the second predetermined temperature, the controller 70 continues to regenerate the particulate filter 60. On the contrary, if the inside temperature of the LNT 40 is lower than the second predetermined temperature, the controller 70 enters the desulfurization mode of the LNT 40 again at the step S150.

Meanwhile, if the inside temperature of the LNT 40 is higher than or equal to the first predetermined temperature at the step S160, the controller 70 continues to desulfurize the LNT 40 and determines whether a desulfurization stop condition of the LNT 40 is satisfied at step S170. That is, the controller 70 determines whether the vehicle speed decreases such that the temperature cannot be raised to a temperature necessary to desulfurize the LNT 40. In addition, the desulfurization stop condition includes any condition where it is difficult to continue the desulfurization due to change of the driving state.

If the desulfurization stop condition of the LNT 40 is not satisfied at the step S170, the controller 70 continues to desulfurize the LNT 40 and determines whether desulfurization amount is greater than or equal to a predetermined desulfurization amount at step S180.

If the desulfurization amount is less than the predetermined desulfurization amount at the step S180, the controller 70 returns to the step S150.

If the desulfurization amount is greater than or equal to the predetermined desulfurization amount at the step S180, the controller 70 stops the desulfurization and the method according to the exemplary embodiment of the present invention is finished.

Meanwhile, if the desulfurization stop condition is satisfied at the step S170, the controller 70 stops the desulfurization of the LNT 40 at step S230 and accumulates desulfurization stop numbers at step S240. Herein, the desulfurization stop numbers mean desulfurization stop numbers accumulated from previous completion of the desulfurization (i.e., a time where the desulfurization is completed without stopping) up to the present. In addition, if the desulfurization is completed, the desulfurization stop numbers are reset to '0'.

After that, the controller 70 determines whether the desulfurization stop numbers are smaller than a predetermined value at step S250.

If the desulfurization stop numbers are smaller than the predetermined value at the step S250, the controller 70 returns to the step S100 and operates the engine 10 at the normal mode.

If the desulfurization stop numbers are greater than or equal to the predetermined value at the step S250, the controller 70 determines whether a sulfur poisoning amount in the LNT 40 is less than a predetermined sulfur poisoning amount at step S260.

If the sulfur poisoning amount in the LNT 40 is less than the predetermined sulfur poisoning amount at the step S260, the controller 70 issues a first warning which suggests desulfurization driving at step S270 and prepares to enter the regeneration mode of the particulate filter 60 again. In this case, since the controller 70 does not exit the desulfurization mode of the LNT 40 completely and prepares to enter the regeneration mode of the particulate filter 60 again, the controller 70 enters the desulfurization mode of the LNT 40 immediately if the desulfurization of the LNT 40 is possible. In addition, the controller 70 suggests the desulfurization driving such that it is induced for a driver to increase the vehicle speed. Therefore, the desulfurization of the LNT 40 can be performed well. The first warning may be issued by turning on a lamp, sending a guide message, or making an announcement.

If the sulfur poisoning amount in the LNT 40 is larger than or equal to the predetermined sulfur poisoning amount at the step S260, the controller 70 determines whether a NOx purification rate of the LNT 40 is greater than a predetermined NOx purification rate at step S280.

If the NOx purification rate of the LNT 40 is greater than the predetermined NOx purification rate at the step S280, the controller 70 issues the first warning at the step S270 and prepares to enter the regeneration mode of the particulate filter 60 again.

If the NOx purification rate of the LNT 40 is smaller than or equal to the predetermined NOx purification rate at the step S280, the controller 70 issues a second warning which suggests visiting a service center at step S290 and the method according to the exemplary embodiment of the present invention is finished. The second warning may be issued by turning on a lamp, sending a guide message, or making an announcement.

Meanwhile, after performing the step S270, the controller 70 determines whether the desulfurization is possible at a current driving condition at step S300. That is, it is determined whether the temperature of the exhaust gas can be raised to the temperature where the desulfurization is possible at the current driving condition.

If the desulfurization is not possible at the current driving condition at the step S300, the controller 70 continues to monitor a driving condition until entering the driving condition where the desulfurization is possible. If the desulfurization is possible at the current driving condition at the step S300, the controller 70 immediately enters the regeneration mode of the particulate filter 60 again at the step S120 and performs the regeneration of the particulate filter 60 and the desulfurization of the LNT 40 sequentially.

As described above, an exemplary embodiment of the present invention may improve fuel economy by preventing frequent conversion of driving modes.

In addition, a memory of the controller can be reduced by simplifying desulfurization control logic.

Furthermore, damage of the engine may be prevented by suggesting desulfurization driving or visiting the service center.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A system of desulfurizing a lean NOx trap (LNT) provided in an apparatus of purifying exhaust gas, the system comprising:
    the LNT adapted to absorb nitrogen oxide (NOx) contained in the exhaust gas at a lean air/fuel ratio and to release the absorbed nitrogen oxide and reduce the nitrogen oxide contained in the exhaust gas or the released nitrogen oxide at a rich air/fuel ratio;
    a particulate filter trapping particulate matter contained in the exhaust gas as soot and regenerated by burning the trapped soot when a regeneration condition is satisfied; and
    a controller controlling desulfurization of the LNT and regeneration of the particulate filter,
    wherein the controller proceeds to desulfurize the LNT when a regeneration amount of the soot is greater than or equal to a predetermined regeneration amount during the regeneration of the particulate filter, stops the desulfurization of the LNT when a desulfurization stop condition is satisfied during the desulfurization of the LNT, and prepares to regenerate the particulate filter again when desulfurization stop numbers from previous completion of the desulfurization up to the present are greater than or equal to a predetermined value and a sulfur poisoning amount is less than a predetermined sulfur poisoning amount.

2. The system of claim 1, wherein the controller completely stops the desulfurization and the regeneration of the particulate filter and enters a normal driving mode when the desulfurization stop numbers from the previous completion of the desulfurization up to the present are smaller than the predetermined value.

3. The system of claim 1, wherein the controller issues a second warning which suggests visiting a service center when the desulfurization stop numbers from the previous completion of the desulfurization up to the present are greater than or equal to the predetermined value, the sulfur poisoning amount is larger than or equal to the predetermined sulfur poisoning amount, and a NOx purification rate is smaller than or equal to a predetermined NOx purification rate.

4. The system of claim 1, wherein the controller proceeds to regenerate the particulate filter again when the desulfurization of the LNT is possible after preparing to regenerate the particulate filter again.

5. The system of claim 4, wherein the controller issues a first warning which suggests desulfurization driving before proceeding to regenerate the particulate filter again.

6. The system of claim 1, wherein the controller prepares to regenerate the particulate filter again when the desulfurization stop numbers from the previous completion of the desulfurization up to the present are greater than or equal to the predetermined value, the sulfur poisoning amount is larger than or equal to the predetermined sulfur poisoning amount, and a NOx purification rate is greater than a predetermined NOx purification rate.

7. The system of claim 6, wherein the controller proceeds to regenerate the particulate filter again when the desulfurization of the LNT is possible after preparing to regenerate the particulate filter again.

8. The system of claim 7, wherein the controller issues a first warning which suggests desulfurization driving before proceeding to regenerate the particulate filter again.

9. A method of desulfurizing a lean NOx trap (LNT) which absorbs or releases/reduces nitrogen oxide contained in exhaust gas according to air/fuel ratio, wherein the LNT is provided in an apparatus of purifying the exhaust gas, and the apparatus of purifying exhaust gas further comprises a particulate filter trapping particulate matter contained in the exhaust gas, the method comprises:
    regenerating the particulate filter;
    determining whether a soot regeneration amount of the particulate filter is greater than or equal to a predetermined regeneration amount;
    performing desulfurization of the LNT when the soot regeneration amount of the particulate filter is greater than or equal to the predetermined regeneration amount;
    determining whether a desulfurization stop condition of the LNT is satisfied;
    stopping the desulfurization of the LNT when the desulfurization stop condition of the LNT is satisfied;
    determining whether desulfurization stop numbers from previous completion of the desulfurization up to the present are greater than or equal to a predetermined value;
    determining whether a sulfur poisoning amount is less than a predetermined sulfur poisoning amount when the desulfurization stop numbers are greater than or equal to the predetermined value; and
    preparing to regenerate the particulate filter again when the sulfur poisoning amount is less than the predetermined sulfur poisoning amount.

10. The method of claim 9, when the desulfurization stop number are smaller than the predetermined value, further comprising entering a normal driving mode.

11. The method of claim 9, wherein the regeneration of the particulate filter is performed again when the desulfurization of the LNT is possible after preparing to regenerate the particulate filter again.

12. The method of claim 11, before performing the regeneration of the particulate filter again, further comprising issuing a first warning which suggests desulfurization driving.

13. The method of claim 9, further comprising:
determining whether a NOx purification rate is greater than a predetermined NOx purification rate when the sulfur poisoning amount is larger than the predetermined sulfur poisoning amount; and
issuing a second warning which suggests visiting a service center when the NOx purification rate is smaller than or equal to the predetermined NOx purification rate.

14. The method of claim 13, further comprising preparing to regenerate the particulate filter again when the NOx purification rate is greater than the predetermined NOx purification rate.

15. The method of claim 14, wherein the regeneration of the particulate filter is performed again when the desulfurization of the LNT is possible after preparing to regenerate the particulate filter again.

16. The method of claim 15, before performing the regeneration of the particulate filter again, further comprising issuing a first warning which suggests desulfurization driving.

* * * * *

UNITED STATES PATENT AND TRADEMARK OFFICE
CERTIFICATE OF CORRECTION

| | | |
|---|---|---|
| PATENT NO. | : 9,145,814 B2 | Page 1 of 1 |
| APPLICATION NO. | : 14/313974 | |
| DATED | : September 29, 2015 | |
| INVENTOR(S) | : Jin Ha Lee | |

It is certified that error appears in the above-identified patent and that said Letters Patent is hereby corrected as shown below:

On the title page, item (54) and in the specification, column 1, line 1, in the title, please delete "DEFULFURIZING" and insert therefor: --DESULFURIZING--. The title of the invention should now correctly read as follows:

--SYSTEM AND METHOD OF DESULFURIZING LEAN NOx TRAP--.

Signed and Sealed this
Sixteenth Day of February, 2016

Michelle K. Lee
*Director of the United States Patent and Trademark Office*